United States Patent [19]

Nakai et al.

[11] 4,139,691

[45] Feb. 13, 1979

[54] POLYMER DEPOSIT INHIBITED PROCESS FOR EMULSION POLYMERIZATION OF VINYL MONOMERS

[75] Inventors: Yoshio Nakai; Masamitsu Tateyama, both of Otake, Japan

[73] Assignee: Mitsubishi Rayon Co., Ltd., Tokyo, Japan

[21] Appl. No.: 863,259

[22] Filed: Dec. 22, 1977

[30] Foreign Application Priority Data

Dec. 27, 1976 [JP]   Japan ................................ 51-157747

[51] Int. Cl.$^2$ ............................................... C08F 2/10
[52] U.S. Cl. ................................. 526/195; 526/74; 526/210; 526/212; 526/317; 526/327; 526/328.5; 526/329; 526/329.7; 526/335; 526/340; 526/341; 526/343; 526/344; 526/346

[58] Field of Search ................. 526/74, 195, 210, 212, 526/215

[56]           References Cited

U.S. PATENT DOCUMENTS

| 3,515,709 | 6/1970 | Nelson et al. | 526/215 |
| 3,988,392 | 10/1976 | Kameda et al. | 260/876 R |
| 3,997,707 | 12/1976 | Aruga et al. | 526/74 |

*Primary Examiner*—Harry Wong, Jr.
*Attorney, Agent, or Firm*—Armstrong, Nikaido, Marmelstein & Kubovcik

[57]              ABSTRACT

This invention relates to a process for emulsion polymerization of a vinyl monomer in an aqueous dispersion medium in which a salt of an N-acylsarcosine and an alkali metal salt and/or ammonium salt of an oxyacid are made to coexist with each other.

5 Claims, No Drawings

POLYMER DEPOSIT INHIBITED PROCESS FOR EMULSION POLYMERIZATION OF VINYL MONOMERS

BACKGROUND OF THE INVENTION

1. Field of the Invention

The present invention relates to a process for emulsion polymerization and, more particularly, to a process for polymerization wherein, in the emulsion polymerization of vinyl monomer, the polymer is prevented from being deposited on the reactor and the amount of coagulated polymer floating in the latex is reduced.

2. Description of the Prior Art

The aqueous emulsion polymerization of vinyl monomers has been widely adopted industrially in such application fields as synthetic rubbers, plastics and paints because, with emulsion polymerization, it is easy to remove reaction heat and the polymerization reaction is freely controlled.

The emulsifying agents heretofore employed in emulsion polymerization are many, and include salts of higher fatty acids, aliphatic long chain sulfonates, aliphatic long chain sulfuric acid ester salts, alkylarylsulfonates, dialkylsulfosuccinates and alkylpolyoxyalkylene phosphoric acid ester salts.

However, one of the most serious problems in carrying out the emulsion polymerization on an industrial scale by using such emulsifiers is the deposition of the polymer on the inner wall of the reactor and such projecting parts as agitators and thermometers.

Particularly, the deposition of the polymer on the inner wall of the reactor will reduce the thermal conductivity so much that the polymerization heat cannot be removed; the smooth polymerization reaction will be impeded and large amounts of labor and time will be required to remove the deposited polymer and has presented a great problem.

Various measures of preventing such deposition of the polymer on the reactor wall or the like have been investigated. For example, there has been suggested a method wherein the inner surface of the reactor is lined with glass. However, in the method wherein the inner surface of the reactor is lined with glass, although the inner surface of the reactor is smooth and the deposition of the polymer is somewhat less than in conventional reactors made of stainless steel, there have been defects in that the reactor is high in manufacturing cost and is liable to be broken at the time of the operation of the reactor or the cleaning of it to remove the deposited polymer or the like.

As a result of making various investigations in view of this background, the present inventors have completed the present invention by discovering a process wherein these problems can be solved at once by using a special aqueous dispersion medium.

SUMMARY OF THE INVENTION

According to the present invention, there is provided a process for emulsion polymerization of vinyl monomers characterized in that the polymerization of the vinyl monomer is carried out in an aqueous dispersion medium in which a salt of an N-acrylsarcosine represented by the general formula:

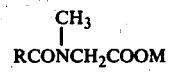

(wherein R represents an alkyl radical or alkenyl radical of 9 to 17 carbon atoms and M represents an alkali metal or ammonium radical), and an alkali metal salt and/or ammonium salt of an oxyacid are present.

DESCRIPTION OF PREFERRED EMBODIMENTS

The salt of the N-acylsarcosine represented by the general formula:

is a salt containing an alkyl radical or alkenyl radical of 9 to 17 carbon atoms. Preferable examples of the salt of the N-acylsarcosine are the alkali metal salts or ammonium salts of the respective substituted sarcosine of N-decanoyl, N-undecylenoyl, N-undecanoyl, N-lauroyl, N-myristoyl, N-palmitoyl, N-oleoyl and N-stearoyl. Sodium or potassium is preferable as the alkali metal salt, although the other alkali metal salts are also useful in this invention.

A salt of the N-acylsarcosine represented by the general formula of an alkyl radical or alkenyl radical of less than 9 or more than 17 carbon atoms is so low in emulsifying ability as not to be useful.

The amount of the salt of the N-acylsarcosine employed according to the present invention in the aqueous dispersion medium is so closely related to the kind of vinyl monomer to be polymerized and the polymerization conditions as not to be able to be generally determined. However, in the present invention, it is employed in an amount of 0.1 to 10 parts by weight or more and, preferably, 0.5 to 5 parts by weight per 100 parts by weight of the monomer.

The oxyacid to be made to co-exist with the salt of the N-acylsarcosine is an alkali metal salt or ammonium salt of an oxyacid having as a center atom, or nucleus, an element selected from the element group belonging to the second and third periods of Groups III to VI of the Periodic Table of Elements. For example, there may be used a borate, aluminate, carbonate, hydrogencarbonate, silicate, nitrate, nitrite, phosphate, phosphite, pyrophosphate, metaphosphate, sulfate and sulfite; borate, phosphate, pyrophosphate and sulfate being preferred. These oxyacid salts can be used alone or can be used in combinations of two or more.

Preferable as alkali metals of the alkali metal salts of oxyacids are lithium, sodium and potassium. The optimum amount of the oxyacid salt to be used varies with the particular N-acylsarcosine employed, the amount of the N-acylsarcosine and other polymerization conditions, but is employed in an amount of an ionic strength in the aqueous dispersion of 0.01 to 1.0 g · ion/kg · $H_2O$. In case the ionic strength is less than 0.01 g · ion/kg · $H_2O$, no substantial effect will develop. In case the inoic strength is larger than 1.0 g · ion/kg · $H_2O$, the emulsification stability will deteriorate and the amount of deposited polymer in the reactor and the formation of coagulated polymer in the latex will increase.

The monomer to be used in the emulsion polymerization according to the present invention is not particularly limited. Any monomer which can be normally emulsion-polymerized can be used. For example, conjugated diene monomers such as butadiene and isoprene; aromatic vinyl monomers such as styrene, α-methylstyrene and chlorostyrenes; vinylcyanide monomers such as acrylonitrile and methacrylonitrile; acrylic acid and methacrylic acid; esters such as acrylic acid and methacrylic acid esters including methyl acrylate, ethyl acrylate, butyl acrylate, methyl methacrylate, ethyl methacrylate and butyl methacrylate; vinyl halides and vinylidene halides such as vinyl chloride and vinylidene chloride and vinyl esters such as vinyl acetate and vinyl propionate are used alone or in combination. Further, crosslinking compounds having two or more copolymerizable unsaturated bonds in the molecule such as, for example, (poly)ethyleneglycol, di(meth)acrylate, allyl(meth)acrylate, triallyl(iso)cyanurate and divinyl benzene can be added to the above mentioned monomer to be polymerized.

The present invention can be advantageously applied, particularly to the case of the emulsion polymerization of a monomer composed mostly of an acrylic ester and methacrylic ester which are comparatively low with respect to the stability of the emulsion-polymerization and are likely to deposit polymer on the inner wall of the reactor and to form coagulated polymer in the latex.

The polymerization initiator to be used in the case of carrying out the present invention is not particularly limited, but there may be enumerated a persulfate, perborate, percarbonate, water-soluble peroxides such as succinic acid peroxide, water-soluble azo compounds such as 4,4'-azobis-4-cyanopentanoic acid and a redox initiator system represented by a combination of ferrous salt with hydrogen peroxide or sodium formaldehyde sulfoxylate with hydroperoxide. The amount of such initiator to be used is about 0.001 to 1 part by weight per 100 parts by weight of the monomer.

The ratio of monomer/water to be employed in carrying out the aqueous emulsion-polymerization according to the present invention is not particularly limited and is about 1/1 to 1/5 and, generally, about 1/1.5 to 1/3. The total amount of monomer can be added at one time to the polymerization system before carrying out the polymerization, but can also be added in stages or continuously during the polymerization depending on the desired polymer.

The polymerization temperature can be varied in any range depending on the kind and composition of the monomer, but is 0° to 150° C. and, generally, in the range of 20° to 100° C.

The process according to the present invention is particularly adapted to a process for production of a latex by emulsion polymerization of vinyl monomers, but can be applied also to an additional aqueous emulsion polymerization process for graft-polymerizing of another, i.e., additional, monomer added into a latex prepared according to the present process.

Furthermore, in carrying out the present invention, depending on the desired object thereof, polymerization regulators, such as mercaptans; plasticizers; stabilizers and coloring agents can also be added.

The present invention shall be explained more particularly in the following examples, in which the parts and percentages are by weight, unless otherwise specified.

EXAMPLE 1

500 g of a mixed monomer consisting of 40 parts of methyl methacrylate and 60 parts of styrene, 950 g of de-ionized water, 5.0 g of sodium N-lauroylsarcosinate and a salt of oxyacid as shown in Table I were added to a reactor of a capacity of 2 liters made of stainless steel and having an agitator made of glass, a thermometer and a nitrogen introducing pipe made of glass. A nitrogen gas was blown in for 15 minutes while agitating the system at room temperature to replace the air in the system, and then the contents were heated from outside with a hot water bath kept at 60° C. When the internal temperature rose to 55° C., 0.5 g of potassium persulfate dissolved in 50 g of de-ionized water was added. After the potassium persulfate was added, the agitation was continued for 3 hours. Then the contents were cooled. The obtained latex was filtered with a metal screen of 100 meshes per inch. The coagulated polymer separated by the filtration was water-washed, dried at 70° C. for 24 hours and then weighed. The polymer deposited on the inner wall of the reactor was also collected, dried in the same manner and weighed. On the other hand, as a result of measuring the amount of the monomer remaining in the latex with a gas chromatograph, it was confirmed that the extent of polymerization was more than 99.5% in all cases.

TABLE I

| Experimental No. | Salts of Oxyacid Kind | Added* Amount (g) | Ion:C Strength $\left(\dfrac{g \cdot ion}{Kg \cdot H_2O}\right)$ | Amount of Coagulated Polymer Weight (g) | Rate (based on monomer put in) (%) | Amount of Deposited Polymer Weight (g) | Rate (based on monomer put in)(%) |
|---|---|---|---|---|---|---|---|
| 1 (Control) | None | — | — | 4.73 | 0.94 | 3.92 | 0.78 |
| 2 (Example) | Sodium borate | 6.64 | 0.10 | 0.43 | 0.086 | 0.41 | 0.082 |
| 3 (Example) | Sodium aluminate | 8.20 | " | 0.46 | 0.092 | 0.47 | 0.094 |
| 4 (Example) | Sodium hydrogen carbonate | 8.40 | " | 0.44 | 0.088 | 0.46 | 0.092 |
| 5 (Example) | Sodium silicate | 1.84 | " | 0.47 | 0.094 | 0.46 | 0.092 |
| 6 (Example) | Potassium nitrate | 10.10 | " | 0.44 | 0.084 | 0.43 | 0.086 |
| 7 (Example) | Disodium hydrogen phosphate | 4.69 | " | 0.37 | 0.074 | 0.40 | 0.080 |
| 8 (Example) | Sodium sulfate | 4.69 | " | 0.42 | 0.084 | 0.39 | 0.078 |

*Calculated as anhydrous salt.

EXAMPLE 2

The results shown in Table II were obtained in the same manner as in Example 1, except that instead of 5 g of sodium N-lauroylsarcosinate, 5 g of sodium lauroyl sulfate were used.

EXAMPLE 3

10 kg of a mixed monomer consisting of 79 parts of butyl acrylate, 21 parts of styrene and 1 part of allylmethacrylate, 29.5 kg of de-ionized water, 130 g of potassium N-palmitoylsarcosinate and a salt of oxyacid as shown in Table 3 were combined in a reactor of a capacity of 40 liters made of stainless steel and having an agitator, thermometer and nitrogen introducing pipe, and a nitrogen gas was blown in for 15 minutes at room temperature while agitating the contents to replace the air in the system. Then the contents were heated by passing hot water at 60° C. through a jacket. When the internal temperature rose to 50° C., 10 g of potassium persulfate dissolved in 500 g of de-ionized water were added. Then the agitation was continued for 4 hours and then the contents were cooled.

The obtained latex was filtered with a metal screen of 100 meshes per inch. The coagulated polymer separated by the filtration was water-washed, dried at 50° C. for 72 hours and weighed. The polymer deposited on the agitator, thermometer and reactor wall was also collected, water-washed, dried and weighed.

g of sodium N-palmitoylsarcosinate, 260 g of potassium palmitate were used.

EXAMPLE 5

10 kg of the latex (containing about 25% polymer) obtained in Experiment No. 9 of Example 3, 2.5 g of sodium formaldehyde sulfoxylate dissolved in 50 g of de-ionized water and 12.5 mg of ferrous sulfate heptahydrate were put in a reactor of a capacity of 15 liters made of stainless steel and having an agitator, thermometer, nitrogen introducing pipe and monomer dropping device. A nitrogen gas was blown in for 15 minutes while agitating the reactor contents at room temperature, and then the contents were heated by passing hot water at 70° C. through a jacket. When the internal temperature rose to 65° C., dropwise addition of the

TABLE II

| Experimental No. | Salts of Oxyacid Kind | Added* Amount (g) | Ionic Strength $\left(\frac{g \cdot ion}{Kg \cdot H_2O}\right)$ | Amount of Coagulated Polymer Weight (g) | Rate (based on monomer put in) (%) | Amount of Deposited Polymer Weight (g) | Rate (based on monomer put in)(%) |
|---|---|---|---|---|---|---|---|
| 1 (Control) | None | — | — | 9.15 | 1.83 | 8.31 | 1.66 |
| 2 (Control) | Sodium borate | 6.64 | 0.10 | 6.81 | 1.36 | 6.72 | 1.34 |
| 3 (Control) | Sodium aluminate | 8.20 | " | 7.22 | 1.44 | 6.91 | 1.38 |
| 4 (Control) | Sodium hydrogen carbonate | 8.40 | " | 6.29 | 1.26 | 6.59 | 1.32 |
| 5 (Control) | Sodium silicate | 1.84 | " | 8.38 | 1.68 | 7.82 | 1.56 |
| 6 (Control) | Sodium nitrate | 10.10 | " | 7.62 | 1.52 | 7.28 | 1.46 |
| 7 (Control) | Disodium hydrogen phosphate | 4.69 | " | 6.39 | 1.28 | 5.82 | 1.16 |
| 8 (Control) | sodium sulfate | 4.69 | " | 6.68 | 1.34 | 6.23 | 1.25 |

*Calculated as to anhydrous salt.

The extent of the polymerization was more than 99.5% based on the initial monomer in all instances.

The results are shown in Table III.

EXAMPLE 4

The results in Table IV were obtained exactly in the same manner as in Example 3, except that instead of 130 monomer shown in Table V was begun. After the monomer was added dropwise for a fixed time, the agitation was continued for one hour as it was then the contents were cooled to obtain a graft-polymer latex.

TABLE III

| Experimental No. | Salts of Oxyacid Kind | Added* Amount (g) | Ionic Strength $\left(\frac{g \cdot ion}{Kg \cdot H_2O}\right)$ | Amount of coagulated Polymer Weight (g) | Rate (based on monomer put in) (%) | Amount of deposited Polymer Weight (g) | Rate (based on monomer put in)(%) |
|---|---|---|---|---|---|---|---|
| 1 (Control) | None | — | — | 74.3 | 0.74 | 122.8 | 1.23 |
| 2 (Control) | Sodium hydrogen carbonate | 17.6 | 0.007 | 63.9 | 0.64 | 78.7 | 0.79 |
| 3 (Example) | Sodium hydrogen carbonate | 75.6 | 0.03 | 9.6 | 0.096 | 11.3 | 0.11 |
| 4 (Example) | Sodium hydrogen carbonate | 252.0 | 0.10 | 8.1 | 0.081 | 9.2 | 0.092 |
| 5 (Example) | Sodium hydrogen carbonate | 1260.0 | 0.50 | 33.3 | 0.33 | 24.0 | 0.24 |
| 6 (Control) | Sodium hydrogen carbonate | 3024.0 | 1.20 | 75.7 | 0.76 | 51.6 | 0.52 |
| 7 (Control) | Disodium hydrogen phosphate | 9.9 | 0.007 | 60.9 | 0.61 | 68.3 | 0.68 |
| 8 (Example) | Disodium hydrogen phosphate | 42.2 | 0.03 | 12.3 | 0.12 | 9.2 | 0.092 |
| 9 (Example) | Disodium hydrogen phosphate | 140.7 | 0.10 | 9.4 | 0.094 | 8.7 | 0.087 |
| 10 (Example) | Disodium hydrogen phosphate | 703.5 | 0.50 | 28.2 | 0.28 | 30.9 | 0.31 |
| 11 (Control) | Disodium hydrogen phosphate | 1688.4 | 1.20 | 59.1 | 0.59 | 53.7 | 0.54 |

*Calculated as anhydrous salt.

TABLE IV

| Experimental No. | Salts of Oxyacid | | | Amount of Coagulated Polymer | | Amount of Deposited Polymer | |
|---|---|---|---|---|---|---|---|
| | Kind | Added* Amount (g) | Ionic Strength ($\frac{g \cdot ion}{Kg \cdot H_2O}$) | Weight (g) | Rate (based on monomer put in)(%) | Weight (g) | Rate (based on monomer put in)(%) |
| 1 (Control) | Sodium hydrogen carbonate | — | — | 323.7 | 3.24 | 217.2 | 2.17 |
| 2 (Control) | Sodium hydrogen carbonate | 17.6 | 0.007 | 286.1 | 2.86 | 203.8 | 2.04 |
| 3 (Control) | Sodium hydrogen carbonate | 75.6 | 0.03 | 276.8 | 2.77 | 210.7 | 2.11 |
| 4 (Control) | Sodium hydrogen carbonate | 252.0 | 0.10 | 203.9 | 2.04 | 183.3 | 1.83 |
| 5 (Control) | Sodium hydrogen carbonate | 1260.0 | 0.50 | 208.3 | 2.08 | 202.4 | 2.02 |
| 6 (Control) | Sodium hydrogen carbonate | 3024.0 | 1.20 | 334.9 | 3.35 | 226.1 | 2.26 |
| 7 (Control) | Disodium hydrogen phosphate | 9.9 | 0.007 | 302.8 | 3.03 | 223.6 | 2.24 |
| 8 (Control) | Disodium hydrogen phosphate | 42.2 | 0.03 | 225.4 | 2.25 | 192.1 | 1.92 |
| 9 (Control) | Disodium hydrogen phosphate | 140.7 | 0.10 | 151.8 | 1.52 | 137.0 | 1.37 |
| 10 (Control) | Disodium hydrogen phosphate | 703.5 | 0.50 | 178.2 | 1.78 | 165.6 | 1.66 |
| 11 (Control) | Disodium hydrogen phosphate | 1688.4 | 1.20 | 276.7 | 2.77 | 252.6 | 2.53 |

*Calculated as anhydrous salt.

The amounts of the coagulated polymer and deposited polymer were measured in the same manner as in Example 3 to obtain the results in Table V.

EXAMPLE 6

The results shown in Table VI were obtained in exactly the same manner as in Example 5, except that the polymer latex obtained in Experiment No. 9 of Example 4 was used.

EXAMPLE 7

29.9 kg of de-ionized water, 120 g of the ammonium salt of N-lauroylsarcosine, 120 g of sodium sulfate, 30 g of sodium formaldehyde sulfoxylate and 3 kg of styrene containing 0.2% cumene hydroperoxide were put in the reactor used in Example 3. A nitrogen gas was passed for 15 minutes while agitating them at the room temperature to replace the air in the system, and then 7 kg of 1,3-butadiene were added and the contents were heated by passing hot water at 55° C. through a jacket. When the internal temperature rose to 40° C., 0.5 g of disodium ethylenediaminetetracetate dissolved in 100 g of de-ionized water and 0.15 g of ferrous sulfate heptahydrate were added from the charging device. Thereafter, the agitation was continued for 12 hours and then the contents were cooled and taken out. When the amount of the coagulated polymer formed in the latex was measured, it was 8.2 g (0.082% based on the monomer put in). The amount of the deposited polymer was 9.1 g (0.091% based on the monomer).

TABLE V

| | Monomers* | | Amount of Coagulated Polymer | | Amount of Deposited Polymer | |
|---|---|---|---|---|---|---|
| Experimental No. | Added Dropwise (Kg) | Addition Time (min) | Weight (g) | Rate (based) on all polymer) (%) | Weight (g) | Rate (based on all polymer) (%) |
| 1 | 0.75 | 30 | 0.39 | 0.012 | 2.34 | 0.072 |
| 2 | 1.25 | 50 | 0.64 | 0.017 | 3.41 | 0.091 |
| 3 | 1.75 | 70 | 0.77 | 0.018 | 4.68 | 0.11 |
| 4 | 2.50 | 100 | 1.05 | 0.021 | 8.00 | 0.16 |

*Composition of dropping monomer:
  Methyl methacrylate    98 parts
  Methyl acrylate         2 parts
  N-octyl mercaptan       0.1 parts
  t-butyl hydroperoxide   0.2 parts

TABLE VI

| | Monomers* | | Amount of Coagulated Polymer | | Amount of Deposited Polymer | |
|---|---|---|---|---|---|---|
| Experimental No. | Added Dropwise (Kg) | Addition Time (min) | Weight (g) | Rate (based on all polymer) (%) | Weight (g) | Rate (based) on all polymer) (%) |
| 1 | 0.75 | 30 | 4.6 | 0.14 | 18.2 | 0.56 |
| 2 | 1.25 | 50 | 12.4 | 0.33 | 23.6 | 0.63 |
| 3 | 1.75 | 70 | 16.2 | 0.38 | 31.5 | 0.74 |
| 4 | 2.50 | 100 | 25.5 | 0.51 | 43.0 | 0.86 |

*Composition of dropping monomer:
  Methyl methacrylate    98 parts
  Methyl acryate          2 parts
  N-octyl mercaptan       0.1 parts
  t-butyl hydroperoxide   0.2 parts Then, by using 10 kg of the obtained latex (containing about 25% polymer), a graft-polymer latex was obtained in the same manner as in Experiment No. 2 of Example 5. In this case, the amount of the coagulated polymer was 0.58 g (0.015% based on the total amount of polymer) and the amount of the deposited polymer was 3.17 g (0.085% on the total polymer).

EXAMPLE 8

When a polymerization was carried out in exactly the same manner as in Example 7, except that the 120 g of sodium sulfate were not used, the amount of the coagulated polymer formed was 42.3 g (0.42% based on the monomer put in) and the amount of the deposited polymer was 52.6 g (0.53% based on the monomer put in). When a graft-polymerization was carried out in the same manner as in Example 7 by using the latex, the amount of the coagulated polymer formed was 9.75 g (0.26% based on the total polymer) and the amount of the deposited polymer was 34.5 g (0.92% based on the total polymer).

What is claimed:

1. A method for emulsion polymerization of a vinyl monomer which comprises emulsion polymerizing a vinyl monomer in an aqueous dispersion medium in which an alkali metal salt and/or an ammonium salt of at least one oxyacid selected from the group consisting of boric acid, aluminic acid, carbonic acid, hydrogencarbonic acid, silicic acid, nitric acid, nitrous acid, phosphoric acid, phosphorous acid, pyrophosphoric acid, metaphosphoric acid, sulfuric acid, and sulfurous acid is allowed to exist in an amount such that the strength of the oxygen acid is 0.01–1.0 g ion/kg $H_2O$, using as an emulsifier 0.1–10 parts by weight per 100 parts of the vinyl monomer of a salt of N-acylsarcosine represented by the general formula

wherein R is an alkyl or alkenyl group of 9–17 atoms and M is an alkali metal or ammonium.

2. The process of claim 1 wherein the salt of the N-acylsarcosine is a member selected from the group consisting of alkali metal salts and/or ammonium salts of N-lauroylsarcosine, N-myristoylsarcosine, N-palmitoylsarcosine, N-stearoylsarcosine and N-oleoylsarcosine.

3. The process of claim 2 wherein the salt of the N-acylsarcosine is a sodium or potassium salt.

4. The process of claim 1 wherein the alkali metal salt of the oxyacid is a salt of lithium, sodium or potassium.

5. The process of claim 1 wherein the vinyl monomer is a member selected from the group consisting of conjugated dienes; aromatic vinyl compounds; vinyl cyanides; acrylic acid, methacrylic acid and their esters; vinyl and vinylidene halides; and vinyl esters.

* * * * *